United States Patent Office 3,522,254
Patented July 28, 1970

---

3,522,254
PROCESS OF PREPARING HALOGENATED COMPOUNDS
Raymond N. Mesiah, Somerset, N.J., assignor to FMC Corporation, New York, N.Y., a corporation of Delaware
No Drawing. Filed Sept. 16, 1968, Ser. No. 762,326
Int. Cl. C07d 55/38
U.S. Cl. 260—248    5 Claims

ABSTRACT OF THE DISCLOSURE

Potassium chlorobromoisocyanurate is produced by continuously introducing potassium dichloroisocyanurate and an alkali metal bromide into an aqueous reaction medium and removing solid potassium chlorobromoisocyanurate which is formed. The solid product so recovered is in a form in which it can be filtered from its aqueous reaction medium and dewatered without difficulty.

BACKGROUND OF THE INVENTION

Cyanuric acid derivatives containing both chlorine and bromine atoms have found use as disinfecting and cleansing agents. The derivatives may be in their acid forms or they may be salts of various metals. Materials of these kinds are disclosed together with other N-brominated halogen compounds for example in U.S. Pats. 2,868,787; 3,147,219; 3,147,254; and 3,147,259. A particularly preferred member of this class of products is potassium chlorobromoisocyanurate, which combines excellent stability with satisfactory water solubility and the ability to release active halogen at the point of use.

As disclosed in the above-enumerated patents, the chlorobromoisocyanurates may be formed by reaction of cyanuric acid or a cyanuric acid salt with bromine under alkaline conditions, followed by chlorination of the brominated intermediate product with chlorine gas, also under alkaline conditions. The use of bromine, particularly in an alkaline reaction medium, involves substantial hazard. This is particularly so in localized areas of high bromine concentration. Furthermore, the process as it has been described has not been entirely satisfactory as regards yields and retention of chlorine and bromine.

Another process employed for producing these materials, which was devised in an attempt to avoid the problems of the process described above, has involved reacting N-chlorinated isocyanuric acid compounds with an alkali metal bromide to yield the corresponding chlorobromoisocyanuric acid compounds. Largely for reasons of economy, safety and control the reaction preferably is carried out in water.

As described in the prior art, the bromide-based process is carried out under batch conditions with all of one ingredient being introduced into the reaction vessel and the other added slowly with mixing. Nowhere in the art is a process of this kind demonstrated in which potassium dichloroisocyanurate is employed as a starting material. When it was attempted to react potassium dichloroisocyanurate with an alkali metal bromide such as potassium bromide or sodium bromide in the presence of water, by a method described in the art with respect to other N-chlorinated isocyanuric acid compounds, the potassium chlorobromoisocyanurate which was produced was of extremely fine particle size and therefore difficult to filter out of the reaction medium. Furthermore, the filtered product retained an excessive amount of water which made it sticky and difficult to dry. As is well known in the art, resort to severe drying conditions in order to overcome problems of this kind causes loss of active halogen. These disadvantages render the process undesirable for commercial operation, particularly because of the difficult handling and processing involved.

It therefore has remained a problem to provide a simple and easily run process for producing potassium chlorobromoisocyanurate.

SUMMARY OF THE INVENTION

I have found that solid, particulate potassium chlorobromoisocyanurate can be produced by continuously introducing potassium dichloroisocyanurate and an alkali metal bromide in molar proportions of about 0.8 to 1.1, and preferably 0.95, moles of the former to one mole of the bromide into an aqueous reaction medium maintained at a temperature from the freezing temperature of the reaction medium to about 35° C., and preferably at 10 to 30° C., permitting the ingredients to react and removing the potassium chlorobromoisocyanurate solids which form.

Quite surprisingly, the product which is formed by the reaction of potassium dichloroisocyanurate and bromide when these reactants are introduced continuously into the reaction medium in the above molar proportions, is in the form of large particles which can be filtered readily from the reaction medium. Furthermore, the filtrate-product does not retain an excessive amount of water, and therefore can be dried easily. This is in marked contrast to what happens when the reaction of potassium dichloroisocyanurate and alkali metal bromide is carried out in a batch process, in which case the product is of very fine particle size and therefore quite difficult to filter, and also retains an excessive amount of water. It is also quite surprising, since substitution of sodium dichloroisocyanurate for potassium dichloroisocyanurate in the continuous process of this invention results in a product which is not easily filtered, and which retains an undue amount of water after filtration.

DESCRIPTION OF THE INVENTION AND THE PREFERRED EMBODIMENTS

The potassium dichloroisocyanurate reacted in our process is available as a particulate, free flowing material which is soluble in water to the extent of about 9 grams in 100 grams of water. Preferably it is introduced into the herein reaction as an aqueous solution, having a concentration of from 5% by weight to a saturated solution. However, alternatively it can be introduced as an aqueous slurry or in solid form. Use of a solution containing less than 5% of the dichloroisocyanurate is possible, but is uneconomical due to the introduction of unneeded water.

The various alkali metal bromides, that is, sodium bromide, potassium bromide and lithium bromide are generally useful as reactants in the present process. They may be introduced in their aqueous solutions, which is preferred, particularly when the concentration of the solution is from 5% by weight to its saturation point and preferably 5 to 50% by weight. However, the bromide may also be introduced as an aqueous slurry or as solids, or even as an equeous solution having a concentration below 5%, although the latter obviously will introduce an unecomically large amount of water.

The potassium dichloroisocyanurate and alkali metal bromide are introduced in molar proportions which provide a molar ratio of from 0.8 to 1 to 1.1:1 and preferably 0.95 to 1, of the former relative to the latter. As noted it is possible to carry out the reaction with an excess of the potassium dichloroisocyanurate, but in view of this being the more costly of the two reactants it is preferred to employ a slight excess of the bromide.

Analysis of the product can be used as a means of monitoring the feed ratio of reactants. That is, when the product issuing from the reaction vessel shows substitution of substantially more or less than one bromine atom on the average, introduction of the reactants may be adjusted until the excess amount of one reactant in the reaction medium has been utilized and the proper balance of chlorine to bromine in the product has been restored. On the other hand, the present process is quite versatile and it is possible quite simply where desired to provide a product having a somewhat higher or lower bromine content than that of potassium chlorobromoisocyanurate. To achieve these ends the ratio of bromide to potassium dichloroisocyanurate can be adjusted such that a greater or lesser substitution occurs and the product contains more or less than the theoretical amount of bromine called for in potassium chlorobromoisocyanurate.

The potassium dichloroisocyanurate and alkali metal bromide are introduced into an equeous reaction medium which initially may be water, or a heel of product dispersed or dissolved in water. The water may be replaced in part, up to on the order of 40% of the amount of water, with an inert, watermiscible organic solvent where desired.

There is no strict limit on the volume of reaction medium into which the reactants are introduced, it being necessary only that there by sufficient reaction medium to carry the reactants and a moderate amount of product. The latter is mostly in solid form due to its being soluble in water only to the extent of 0.3 g./100 g. of water.

Generally speaking, for most efficient operation the total concentration of reactants and products in the reaction medium, as solids or in solution, should not exceed about 25% by weight. On the other hand, operation with an excessive volume of reaction medium, for example such that the total concentration of reactants and product present is less than about 2% by weight, is uneconomical.

The reactants are fed at such a rate that the total concentration of reactants and product in the reaction medium is maintained generally within the above limits. Obviously as the size of the reaction vessel and the manner of removal of product are varied, the optimum rate of feed of ingredients will vary.

The product formed in the reaction during the first few minutes, e.g. for about ten minutes following startup, is of very fine particle size, for example on the order of 2 to 3 microns. The situation quickly changes to where the solid product particles have a size of about 40 to 50 microns or larger, and therefore can be filtered readily on a filter pump, centrifugal filter, filter funnel or the like having a coarse filtering medium. As recovered in the form of filtered solids the potassium chlorobromoisocyanurate has quite a dry feel and typically contains only about 15 to 20% by weight of water. It is dried readily at 60° C. preferably under a vacuum, in a very short time which typically is on the order of 60 to 90 minutes.

The reaction of potassium dichloroisocyanurate and alkali metal bromide is essentially instantaneous, and accordingly the rate at which the reactants can be put through the system is not critical and depends largely on the ability of the particular reactor and recovery hardware to feed reactants and to separate solid product and process it through the drying stage.

Holding of the product under wet conditions, either in the reaction vessel or in the form of wet filtrate, may result in the loss of some active halogen from the molecule particularly when the system is warm. Accordingly, it is desirable to remove the product from the reactant vessel on a continuous basis as it is formed and to dry it as soon as possible, generally not more than 2 to 3 hours after its separation from the reaction medium. However, it is possible to remove the product solids on a periodic basis, provided not too prolonged a period, that is not greater than 2 to 3 hours, passes before product is recovered.

The reaction is best carried out at a temperature of from just above the freezing point of the solution to 35° C. and preferably at 10 to 30° C. If it is run at a temperature above about 35° C. an undue loss of active halogen from the product may result.

The pressure at which the reaction is carried out is not critical, it being possible to operate at subatmospheric pressures. However, for simplicity of operation the reaction is generally carried out at ambient presusres.

The following examples are given by way of illustration of this invention only and are not to be considered as limiting the scope thereof in any way. Wherever percentages are given they are on the basis of percent by weight of the total.

EXAMPLE 1

Potassium chlorobromoisocyanurate—continuous process

A glass cylinder reactor 12 inches tall, 4 inches in diameter and having an overflow port 9.5 inches from the bottom providing a total working capacity of 1400 ml., was used. The reactor top was fitted with a large rubber stopper through which was inserted a mechanical stirrer, a thermowell, two pH electrodes and two lines equipped with pumps for introducing liquor below the surface of the reaction medium. The slurry of product solids which overflowed was collected on a coarse fritted funnel having a pore size of 40–60 microns.

Potassium dichloroisocyanurate (660 g., 2.8 moles) was dissolved in enough water to provide a total volume of 8 liters. Potassium bromide (366.4 g., 3.08 moles) was dissolved in sufficient water to provide a total volume of 6.8 liters. The potassium dichloroisocyanurate was pumped into the reactor containing 0.9 liter of water held at 25° C., the temperature at which the reaction was conducted, at a rate of 42.7 ml./min. (0.015 mole/min.) and at the same time the potassium bromide solution was pumped in at the rate of 30.9 ml./min. (0.016 mole/min.).

Within three minutes white solids began to overflow. The overflow was collected in the coarse fritted funnel; initially, the product crystals were relatively small, that is about 3 to 5 microns, and most of them passed through the funnel. However, after 10 minutes the crystal size had increased sufficiently so that they were retained on the funnel. The crystals continued to increase in size during the next 45 minutes, and remained thereafter at a relatively constant size of about 40 microns. After 3.3 hours both solutions had been pumped into the reactor whereupon the reactor contents were filtered on the funnel and the reaction completed.

The product filtered rapidly over the fritted funnel, which had a pore size of 40 to 60 microns, providing a dry feeling material. The product solids were washed with three 300 ml. portions of water, following which the wet cake, which weighed 694 grams was dried in vacuo at 50 to 60° C. at 20 mm. Hg for three hours to give 594 grams (76.3% yield) of white solid potassium chlorobromocyanurate. This product analyzed 32.1% active bromine and 11.7% active chlorine, values which agreed well with theoretical active bromine and active chlorine values of 28.5% and 12.6% respectively.

The amount of water in the filtered product, which was a dry-feeling white solid, was only 14.4% and this water was easily removed as described.

EXAMPLE 2

Potassium chlorobromoisocyanurate—continuous process

Example 1 was repeated except that 3.08 mole of sodium bromide was substituted for the 3.08 mole of potassium bromide employed in that example. A potassium chlorobromoisocyanurate product was obtained which had an active bromine value of 27.1% and an active chlorine value of 14.0%. This product also contained 0.5% of sodium, and was produced in a yield of 76.7%. This product showed the same desirable low water retention (in this instance 19%) as exhibited by the product of Example 1 and had a similar feel and was dried without difficulty.

EXAMPLES 3 AND 4

Potassium chlorobromoisocyanurate—continuous process

The procedure of Example 1 was repeated except that the potassium dichloroisocyanurate and potassium bromide were fed in the molar proportions of 1:1 and 1.1:1. The products had active bromine and active chlorine contents close to theory. They were white solids having the same low water retentivities, dry feel and ready dryability exhibited by the products of Examples 1 and 2.

EXAMPLE A.—COMPARATIVE

Batch—potassium chlorobromoisocyanurate

Potassium dichloroisocyanurate (67.1 g., 0.28 mole) was dissolved in one liter of water in a two-liter beaker fitted with a mechanical stirrer, an ice bath, a thermometer and a dropping funnel containing 33.8 grams (0.28 mole) of potassium bromide dissolved in 90 ml. of water. The potassium dichloroisocyanurate solution was cooled to 18° C. and the potassium bromide solution added dropwise over a 25 minute period at that temperature. As the first two ml. of potassium bromide solution was added white solids precipitated and solids precipitation continued throughout addition of the bromide.

The thick white slurry of solids which resulted was stirred for an additional 20 minutes. The product slurry passed through the coarse fritted funnel used in Example 1, and therefore had to be filtered through a funnel having smaller pores measuring about 10 microns. The slurry filtered very slowly, providing wet, sticky solids. These solids were washed with two 65-ml. portions of water. They were dried in vacuo at 20 mm. Hg and at 80 to 85° C. to yield yellowish-white solids. In this instance the filtered product retained 40% of water as opposed to the 15 to 20% retention in the products of Examples 1 to 4. The product analyzed only 24.1% active bromine and contained 14.6% active chlorine.

EXAMPLE B.—COMPARATIVE

Batch—potassium chlorobromoisocyanurate

The procedure of comparative Example A above was repeated with the exception that the potassium bromide was replaced with sodium bromide in a like amount of 0.28 mole. The product, which also was a wet, sticky solid product, was obtained which was too fine for filtering through a coarse fritted funnel, and had to be filtered on a fine filter of the kind employed in Example A. It analyzed 14.7% active chlorine, 23.1% active bromine, 8.5% potassium and 2.5% of sodium, and it retained 45% of water as recovered on the medium-porosity filter used in Example A above.

EXAMPLE C.—COMPARATIVE

Continuous process—sodium chlorobromoisocyanurate

When the process of Example 1 was repeated, in this instance employing 2.8 moles of sodium dichloroisocyanurate in place of the potassium dichloroisocyanurate of Example 1 and sodium bromide in place of potassium bromide of Example 1, a product was obtained which was similar in its physical characteristics to the products of comparative Examples A and B above. That is, the product was very fine as it precipitated from the reaction mixture, such that it could not be filtered through the coarse fritted funnel (pore size 40–60 microns). Furthermore, it was a wet and sticky material which contained 55% of water as recovered from the fine-pored funnel (10 micron size). After drying in vacuo at 50–60° C. the solids analyzed 31% of active bromine and 0.2% active chlorine.

The above examples demonstrate the specific nature of my continuous process for producing potassium chlorobromoisocyanurate by reaction of potassium dichloroisocyanurate with an alkali metal bromide. It is shown that this process provides a very easily filtered and dried product, whereas when similar reactants are reacted in a batch process, or when sodium dichloroisocyanurate is reacted with sodium bromide in a continuous process of the kind employed herein with potassium dichloroisocyanurate, the product is of a very fine particle size, and exhibits a high retention of water.

The ability of the process of this invention to produce a product which can be separated easily from the reaction medium and when separated can be dried and handled without difficulty is most important to design of practical, commercial facilities for production of the product.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that within the scope of the appended claims, the invention may be practiced by those skilled in the art and having the benefit of this disclosure otherwise than as specifically described and exemplified herein.

What is claimed is:

1. A process of producing potassium chlorobromoisocyanurate in which potassium dichloroisocyanurate and an alkali metal bromide are fed continuously at a molar ratio of potassium dichloroisocyanurate to alkali metal bromide of 0.8:1 to 1.1:1, into an aqueous reaction medium which is held at a temperature of from the freezing temperature of said reaction medium to 35° C., whereby solid, particulate potassium chlorobromoisocyanurate is formed which can be separated readily from said reaction medium to provide a solid product which is non-tacky and easily dried.

2. The process of claim 1 in which the alkali metal bromide is potassium bromide.

3. The process of claim 1 in which the alkali metal bromide is sodium bromide.

4. The process of claim 1 in which the molar ratio of potassium dichloroisocyanurate to the alkali metal bromide is 0.95 to 1.

5. The process of claim 1 in which the temperature is 10 to 30° C.

References Cited

UNITED STATES PATENTS 3,147,254   1/1964   Paterson _____ 260—248 XR

HENRY R. JILES, Primary Examiner

J. M. FORD, Assistant Examiner